US006956614B1

(12) United States Patent
Quintana et al.

(10) Patent No.: US 6,956,614 B1
(45) Date of Patent: Oct. 18, 2005

(54) APPARATUS AND METHOD FOR USING A WEARABLE COMPUTER IN COLLABORATIVE APPLICATIONS

(75) Inventors: W. Vincent Quintana, Bath, ME (US); Michael Edward Pinkham, Bath, ME (US); J. Scott Houston, Topsham, ME (US); Mark A. Norton, Cushing, ME (US); Joseph J. Petruska, Sabbatus, ME (US); F. Christopher Mitchell, Arlington, VA (US)

(73) Assignee: Bath Iron Works, Bath, ME (US)

( * ) Notice: Subject to any disclaimer, the term of this patent is extended or adjusted under 35 U.S.C. 154(b) by 823 days.

(21) Appl. No.: 09/721,091

(22) Filed: Nov. 22, 2000

(51) Int. Cl.$^7$ ............................................... H04N 5/225
(52) U.S. Cl. ....................................... 348/373; 348/158
(58) Field of Search ................................ 348/373, 374, 348/375, 376, 158, 61; 345/8; 361/683; 369/25.01; 704/275, 235; 224/262, 270, 660, 181

(56) References Cited

U.S. PATENT DOCUMENTS

| | | |
|---|---|---|
| 4,976,387 A | 12/1990 | Spianti |
| 5,124,915 A | 6/1992 | Krenzel |
| 5,305,244 A | 4/1994 | Newman et al. |
| 5,533,097 A | 7/1996 | Crane et al. |
| 5,594,498 A * | 1/1997 | Fraley ........................ 348/158 |
| 5,675,807 A | 10/1997 | Iswandhi et al. |
| D385,855 S | 11/1997 | Ronzani |
| 5,691,713 A | 11/1997 | Ishida |
| D387,898 S | 12/1997 | Ronzani |
| 5,699,244 A | 12/1997 | Clark, Jr. et al. |
| D390,552 S | 2/1998 | Ronzani |
| 5,719,743 A | 2/1998 | Jenkins et al. |
| 5,719,744 A | 2/1998 | Jenkins et al. |
| 5,726,660 A | 3/1998 | Purdy et al. |
| 5,757,339 A | 5/1998 | Williams et al. |
| 5,774,338 A | 6/1998 | Wessling, III |
| 5,787,298 A | 7/1998 | Broedner et al. |
| 5,831,198 A | 11/1998 | Turley et al. |
| 5,844,656 A | 12/1998 | Ronzani et al. |
| 5,844,824 A | 12/1998 | Newman et al. |
| 5,886,739 A * | 3/1999 | Winningstad ............... 348/158 |
| 5,893,037 A | 4/1999 | Reele et al. |
| D411,179 S | 6/1999 | Toyosato |
| 5,948,047 A | 9/1999 | Jenkins et al. |
| 5,983,073 A | 11/1999 | Ditzik |
| 5,991,831 A | 11/1999 | Lee et al. |
| 5,995,936 A | 11/1999 | Brais et al. |
| 5,999,952 A | 12/1999 | Jenkins et al. |
| 6,006,286 A | 12/1999 | Baker et al. |
| 6,023,241 A | 2/2000 | Clapper |
| 6,029,183 A | 2/2000 | Jenkins et al. |
| 6,049,813 A | 4/2000 | Danielson et al. |

(Continued)

OTHER PUBLICATIONS

"Case Study—Shipbuilder Trims Inspection and Troubleshooting Time by 70%," ViA, Inc. web site (www.via-pc.com), May 2000 (precise date of publication unknown), published by ViA, Inc., Burnsville, Minnesota.
Steve Ditlea, "The PC goes ready-to-wear," IEEE Spectrum, vol. 37, No. 10, Oct. 2000, (pages unknown—available online at www.spectrum.ieee.org).
Lisa Guernsey, Wearable Computers For The Working Class, N.Y. Times, Dec. 14, 2000.
Anne Eisenberg, The World Through PC Powered Glasses, N.Y. Times, Dec. 14, 2000.

*Primary Examiner*—Aung Moe
(74) *Attorney, Agent, or Firm*—Michael J. Bell; Howrey LLP

(57) ABSTRACT

An apparatus and method for using a wearable computer in collaborative applications that uses a general inspection camera, a detailed inspection camera, a display, a computer adapted to use wireless communication and to facilitate collaborative applications, a battery, an audio communication device, and a harness for securing these components to a person's body.

34 Claims, 4 Drawing Sheets

U.S. PATENT DOCUMENTS

| | | |
|---|---|---|
| 6,055,372 A | 4/2000 | Kardach et al. |
| D423,761 S | 5/2000 | Ng et al. |
| 6,057,966 A | 5/2000 | Carroll et al. |
| 6,061,411 A | 5/2000 | Wooten |
| 6,064,566 A | 5/2000 | Agata et al. |
| 6,219,697 B1 | 4/2001 | Lawande et al. |
| 6,219,736 B1 | 4/2001 | Klingman |
| 6,249,427 B1 | 6/2001 | Carroll |
| 6,260,202 B1 | 7/2001 | Villalobos et al. |
| 6,285,757 B1 | 9/2001 | Carroll et al. |
| 6,292,213 B1 | 9/2001 | Jones |
| 6,305,587 B1 | 10/2001 | Miller |
| 6,307,526 B1 * | 10/2001 | Mann .............................. 345/8 |
| 6,324,053 B1 * | 11/2001 | Kamijo ....................... 361/683 |
| 6,356,968 B1 | 3/2002 | Kishon |
| 6,522,531 B1 * | 2/2003 | Quintana et al. ............... 345/8 |
| 6,563,532 B1 * | 5/2003 | Strub et al. .................. 348/158 |
| 6,574,672 B1 * | 6/2003 | Mitchell et al. ............. 709/250 |
| 2002/0054174 A1 * | 5/2002 | Abbott et al. ................ 345/863 |
| 2002/0074370 A1 * | 6/2002 | Quintana et al. ........... 224/262 |
| 2003/0072571 A1 * | 4/2003 | Wechsler et al. ........... 396/422 |

\* cited by examiner

APPARATUS AND METHOD FOR USING A WEARABLE COMPUTER IN COLLABORATIVE APPLICATIONS

CROSS REFERENCE TO RELATED APPLICATION

This application is directed to subject matter that is related to the subject matter of U.S. patent application Ser. No. 09/696,758 for "Apparatus and Method for Using a Wearable Personal Computer" filed Oct. 25, 2000 and U.S. patent application Ser. No. 09/739,136 for "Apparatus and Method for Using a Wearable Computer in Testing and Diagnostic Applications" filed Dec. 18, 2000.

BACKGROUND OF THE INVENTION

1. Field of the Invention

The present invention relates generally to wearable computers, and more particularly to a wearable computer for use in collaborative applications.

2. Description of the Related Art

Construction and manufacturing projects require that structures and components be built to exacting specifications and strict time schedules. Manufacturing industries, including, for example, shipbuilding, aircraft manufacturing, and automobile manufacturing, often involve modular construction where individual components of a final product are built simultaneously and at different physical locations. These components must be constructed in a precise manner to ensure that the individual components will fit together properly. When problems arise during the construction of these individual components, the manufacturers must respond quickly to ensure that the problem is properly resolved, design changes are properly recorded, and the project does not fall behind schedule. The same concerns apply to other construction projects where various components of the project are constructed simultaneously and often at separate locations.

The traditional response to a problem that arises during manufacturing or construction is a telephone call from the onsite individual who discovers the problem to an engineer or other individual responsible for resolving the problem. Ideally, the engineer is located near the job site and can travel to the site without undue inconvenience. However, often the engineer is located a great distance from the site of the problem and cannot respond in an expedient manner. Regardless of the engineer's location, the engineer typically must travel to the job site, make notes by hand, and then return to the engineer's office to review plans and other technical information to resolve the problem. The engineer often must make repeated visits to the job site to gather further information regarding the problem before any solution can be formulated. This traditional method of problem resolution often consumes a considerable amount of time, thus wasting precious production time.

Wearable computers are computers that may be physically worn on the body of the person operating the computer. Wearable computers are preferred when there is insufficient space to set up a lap top or desk top computer. Wearable computers have been used for report preparation and other data gathering activities. However, the use of a wearable computer only for data gathering functions does not meet the needs of problem resolution in a manufacturing or construction setting. In addition, even if a wearable computer that had the technical information regarding the structure or project were available on-site, it would be of limited use absent the ability to collaborate with one or more other individuals who could offer expertise and insight into resolving the problem.

Therefore, it would be desirable to provide a person at the location of interest with the ability to use a wearable computer in a real time collaborative manner with one or more off-site individuals who could help to resolve the issue presented or otherwise assist in the task to be performed by the on-site individual.

SUMMARY OF THE INVENTION

The present invention is a method and apparatus for using a wearable computer in collaborative problem resolution and collaborative design applications. In a preferred embodiment, the present invention comprises a general inspection camera; a detailed inspection camera; a display; a device to be used for wireless audio communication; a computer adapted to exchange data using wireless communication and adapted to facilitate collaborative applications between an individual at the location of interest and an individual at a remote location; a battery to supply power to the general inspection camera, the detailed inspection camera, the display, the wireless audio communications device, and the computer; and a harness to support any or all of the foregoing components from the body of a person.

The present invention permits an individual who is on-site at a manufacturing, construction, or inspection project (hereinafter "liaison") to collect data for use in collaborative problem resolution or collaborative design survey or design audit applications (hereinafter "design audits"), to share this data using wireless communication with an engineer or other individual who will assist in the problem resolution or design audit (hereinafter "remote engineer"), and to collaborate with such individuals, in real time, using the data collected by the liaison to resolve the encountered problem or complete the design audit. The present invention also may be used by multiple liaisons and/or multiple remote engineers to resolve a common problem or complete a common design audit.

While the present invention may be used in a wide range of manufacturing, construction, and inspection applications as well as a wide range of design audit applications, the following description of the use of the present invention in the shipbuilding industry illustrates one use of the present invention. As with other large scale manufacturing and construction operations, the construction of a ship is divided into manageable units. These individual units that are later assembled into the complete ship must be constructed to precise specifications. Whenever any design problems or issues arise during the construction of these units, a designer or other person responsible for quality control (hereinafter "design representative") generally is contacted to resolve the problem or issue. Traditionally, the design representative typically would be dispatched to the work site to make an initial assessment of the problem. The design representative typically would make a few hand sketches and then return to the office to review the latest drawings and to research a mainframe database for outstanding drawing revision notices that could either resolve or compound the encountered problem. In difficult situations, the design representative may even be forced to make another trip to the problem location to conduct a further review and then return to the engineering offices to review, for example, three dimensional computer aided design ("CAD") models that often are used in design control. While the design representative endeavors to resolve the problem, which may take several hours or even longer, the production process is interrupted, potentially causing overall production schedule to be delayed.

Using the present invention, the time and effort required to resolve any design or other problems arising during the construction of the above mentioned ship units can be significantly reduced. For example, when a design or other problem is encountered during the construction of a ship unit, an individual (hereinafter "liaison") using an apparatus according to a preferred embodiment of the present invention can be dispatched to the location of the problem or other issue. The apparatus preferably includes a general inspection camera, a detailed inspection digital camera, a visual display, a wearable computer, a wireless telephone or other device for audio communication, and a harness supporting the general inspection camera, detailed inspection digital camera, display, wearable computer, and wireless telephone or other device for audio communication from the liaison's body. Once the liaison has had a chance to assess the situation, the liaison may use the present invention to access plans and/or specifications or any other information stored either locally or remotely on a database that may offer assistance in resolving the situation. These plans and/or specifications can be stored locally on the wearable computer or at another, remote database. The liaison likewise may use the wireless telephone or other means for wireless audio communication to contact and collaborate with a remote engineer who can assist in the resolution of the issue. The present invention can be used simultaneously by multiple liaisons and/or remote engineers to resolve related issues in real time.

In a typical situation, the liaison would first use the general inspection camera to provide real time video to the remote engineer using wireless communication to give the remote engineer a general understanding of the proximity and nature of the problem. The liaison then can use the detailed inspection camera to take high resolution snap-shots that can be downloaded to the liaison's wearable personal computer. Using a software application that permits real time collaboration, the liaison may then transmit the snapshots to the remote engineer. The liaison may likewise annotate the snapshots, with the collaboration software enabling the remote engineer to view the annotations in real time. The remote engineer may likewise annotate the snapshots, which also may be viewed in real time by the liaison.

Either the remote engineer or liaison may also access plans and specifications for use in resolving the encountered issue. These plans and specifications may likewise be annotated in real time, thus allowing for a collaborative resolution of the issue presented. While the above example is set in the shipbuilding context, the present invention may likewise be used in other fields including, without limitation, aircraft and automobile manufacturing, construction, and inspection applications.

DETAILED DESCRIPTION OF THE PREFERRED EMBODIMENT

The present invention is a method and apparatus for using a wearable computer in collaborative applications. For example, the present invention may be used in areas such as ship, aircraft, and automobile manufacturing, construction projects, and inspection, design, audit, and quality assurance projects. The present invention may be used to decrease the response time to production and other problems encountered during manufacturing, construction, and inspection projects. The present invention permits a liaison who is on-site at a manufacturing, construction, inspection site, or other location of interest to collect data for use in problem resolution or other collaborative applications; transmit the collected data using wireless communication means that include, without limitation, wireless local area network ("WLAN") communication, ad hoc wireless communication, peer to peer wireless communication, and narrow and/or broadband wireless communications, all including both secure and unsecure transmission, to an engineer or other individual at any location who will assist in the problem resolution or collaborative collection of data regarding the location of interest (hereinafter "remote engineer"); and collaborate with the remote engineer to resolve the problem or collect data regarding the location of interest. The present invention also permits the liaison to engage in a collaborative "design audit" or "design survey" with a remote engineer. In this collaborative design audit or design survey, the liaison collaborates with a remote engineer to collect data regarding an existing structure or other object of interest for use in future designs or other planning. The present invention also may be used to permit multiple liaisons and/or multiple remote engineers to collaborate in real time.

Figure 1:
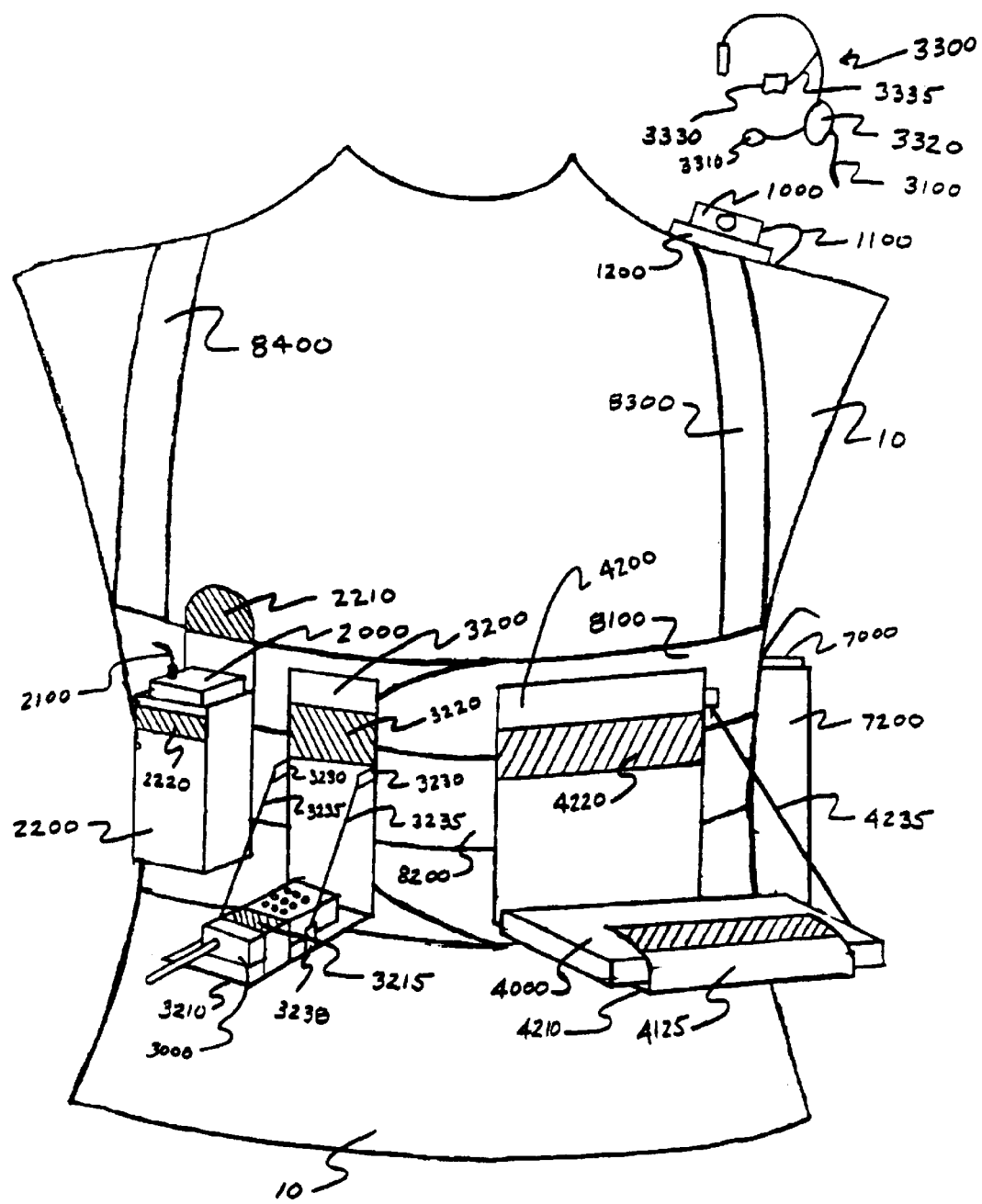
FIG. 1 is a front view of the present invention as worn on the body of a person.
Figure 2:
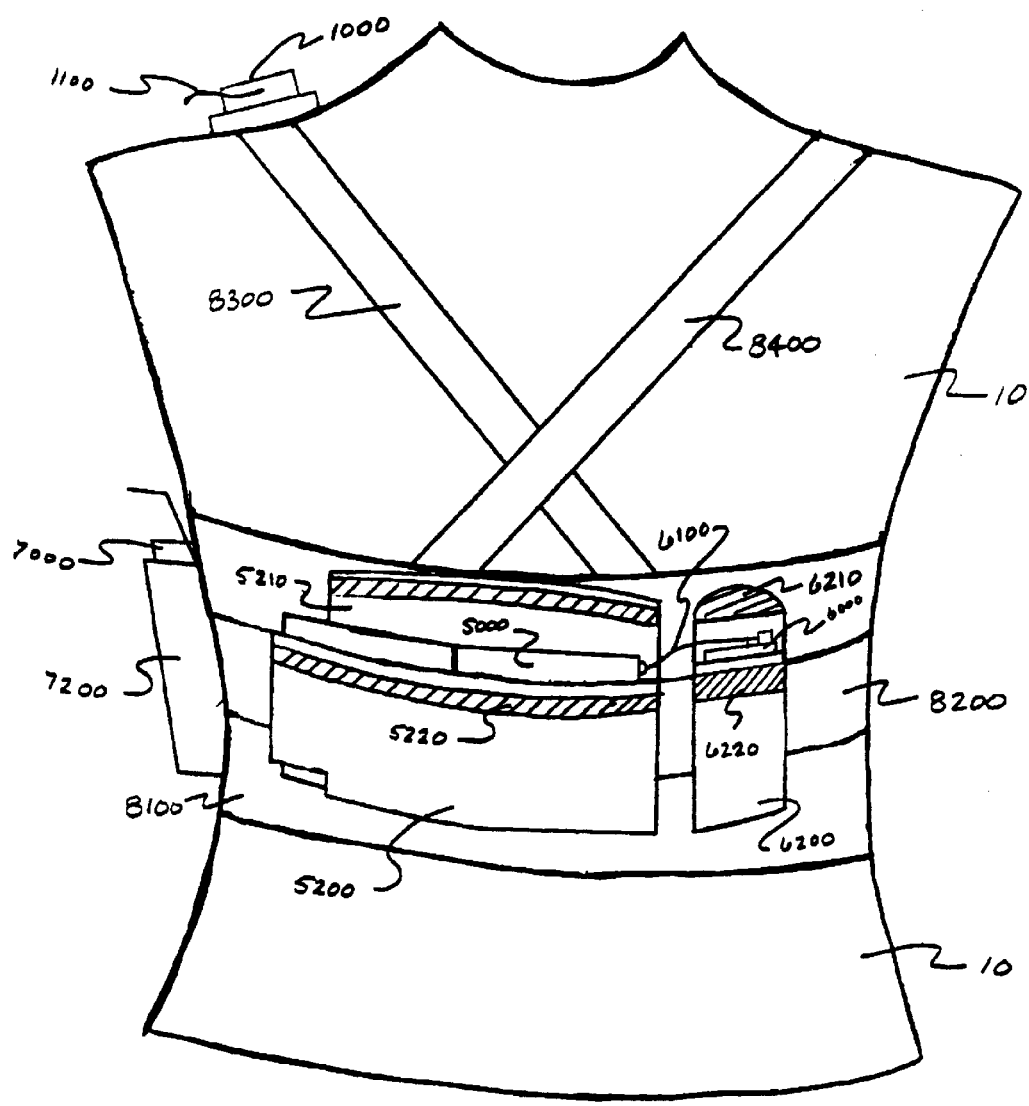
FIG. 2 is a rear view of the present invention as worn on the body of a person.
Figure 4:
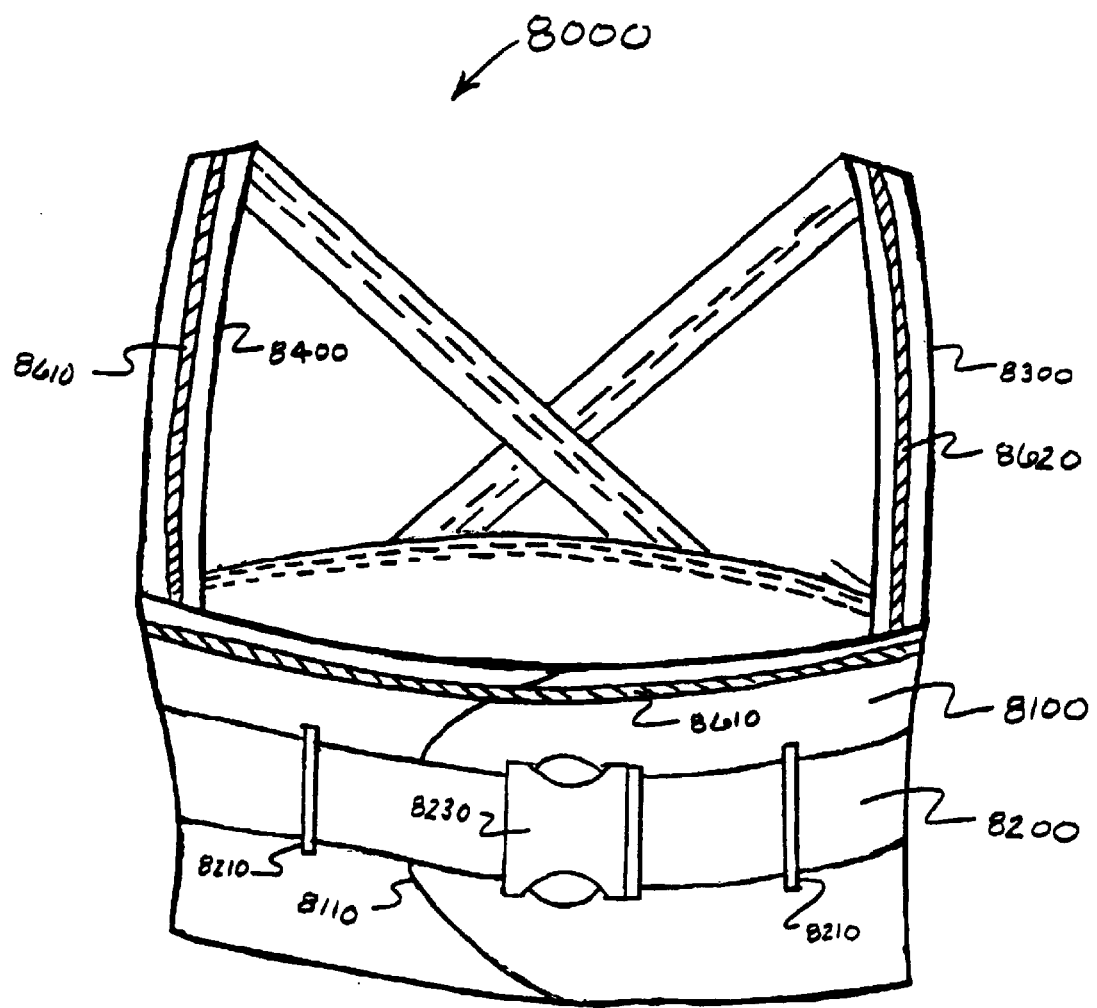
FIG. 4 is a schematic diagram of an apparatus to support components from the body of a person according to the present invention.

Referring to FIG. 1, FIG. 2, and FIG. 4, the present invention preferably comprises a general inspection camera 1000, a detailed inspection camera 2000 preferably stored in a detailed inspection camera storage case 2200, a wireless telephone 3000 or other means for wireless audio communication preferably mounted in a wireless telephone housing 3200, a display unit 4000 preferably stored in a display housing 4200, a computer 5000 preferably stored in a computer housing 5200, a battery 6000 preferably stored in a battery housing 6200, an interface hub 7000 preferably stored in a hub housing 7200 and a harness 8000 that supports any or all of the foregoing and/or other components from the body 10 of the liaison using the present invention.

1. Cameras

Referring to FIG. 1, general inspection camera 1000 and detailed inspection camera 2000 can be used to collect video data that is transmitted using wireless communication to the remote engineer for use in collaborative problem resolution or other collaborative applications. Unless specified otherwise herein, the term "video" includes, without limitation, NTSC, PAL, H.320, H.323, H.324, T.120, or composite or component video as required. General inspection camera 1000 preferably is used to provide real time video data to the remote engineer to provide the remote engineer with an overall idea of where the problem is located and the general nature of the problem or an overall perspective of the location of interest. Detailed inspection camera 2000 preferably is used to provide detailed "snapshots" of the location of interest to the remote engineer to allow the remote engineer to assess the precise nature of the problem or gather precise data regarding the location of interest. For example, the liaison wearing the present invention can first use general inspection camera 1000 to provide real time video to the remote engineer using wireless communication. Once the remote engineer understands the general nature of the problem and the general location of the problem, the liaison can use detailed inspection camera 2000 to take high-resolution "snapshots" of the encountered problem. The liaison will then upload these high resolution snapshots to computer 5000 for subsequent transmission using wireless communication to the remote engineer.

As shown in FIG. 1, general inspection camera 1000 preferably is mounted upon a left shoulder strap 8300 of harness 8000. However, general inspection camera 1000 may likewise be mounted upon right shoulder strap 8400 or at any other location suitable for collecting video data. General inspection camera 1000 preferably is secured to a camera mounting pad 1200 using elastic straps (not shown), but may also be secured to camera mounting pad 1200 using any other suitable fastening means including hook and piling fastener tape, snaps, buttons, zippers, and clips. Camera mounting pad 1200 preferably is secured to shoulder strap 8300 using hook and pile fastener tape that is secured to the lower surface of camera mounting pad 1200 and the outer surface of shoulder strap 8300. However, any suitable fastening means may be used to secure camera mounting pad 1200 to shoulder strap 8300 including, without limitation, zippers, buttons, snaps, and clips.

Referring to FIG. 2, general inspection camera 1000 transmits video data to computer 5000 using video cable 1100. In one embodiment of the present invention, video cable 1100 is a USB cable. However, video cable 1100 may be any means suitable for transmitting video data including, without limitation, a USB v. 2.0 or "firewire" interface. In a preferred embodiment of the present invention, general inspection camera 1000 is a 3Com Home Connect web camera, available from 3Com, Inc., 5400 Bayfront Plaza, Santa Clara, Calif., 95052-8145. The software drivers of this camera fully support Microsoft Windows "plug and play," which permits the "hot swapping" of USB devices. In addition to the 3Com Home Connect web camera, any camera suitable for collecting and transmitting real time video data may be used as general inspection camera 1000. Preferably, general inspection camera 1000 is characterized by features including low bandwidth, low light sensitivity, rugged construction, compatibility with existing interface ports, water resistance, thermal resistance to both high and low temperatures, shock resistance, and a low profile. In another embodiment of the present invention, general inspection camera 1000 may be a high resolution video camera.

As shown in FIG. 1, detailed inspection camera 2000 preferably is used to collect detailed "snapshots" of the problem to be resolved. Detailed inspection camera 2000 preferably is stored in camera storage case 2200 when not in use. Camera storage case 2200 preferably is secured to harness 8000, as will be discussed further below.

When detailed imagery snapshots are desired, the liaison preferably removes detailed inspection camera 2000 from camera storage case 2200, powers up camera 2000 if the power is not already turned on, and takes the desired snapshots. After the desired snapshots are taken, the snapshots are downloaded to computer 5000 using video cable 2100. Camera 2000 can have its own power source, or it can be powered by battery 6000. If camera 2000 uses its own power source, video cable 2100 does not need to be connected to camera 2000 while the snapshots are taken. In this embodiment, the snapshots may be reviewed before they are downloaded to computer 5000 and then transmitted using wireless communication. This embodiment preferably is used to ensure that confidential or otherwise restricted access information is not accidentally downloaded or transmitted. If camera 2000 receives its power from battery 6000, such power can be provided via video cable 2100 connecting camera 2000 to computer 5000, which in turn is connected to battery 6000 via cable 6100. In this embodiment, camera 2000 is connected to computer 5000 while the snapshots are taken.

Once the desired snapshots are taken, the snapshots can be downloaded to computer 5000 using video cable 2100. Once the snapshots are downloaded to computer 5000, the liaison may view the snapshots on display unit 4000. In a preferred embodiment of the present invention, the liaison can then annotate the snapshots using a touch screen display unit 4000. For example, the snapshots taken with camera 2000 can be annotated using the Netmeeting software application, available from Microsoft, Inc., One Microsoft Way, Redmond, Wash., 98052-6399. Netmeeting is preferred because of its "whiteboarding" feature, which permits individuals using the Netmeeting software to bring up a bitmap image, which is the snapshot taken by camera 2000, and share the ability to mark-up and annotate the image. In the present invention, the use of this "whiteboarding" feature permits live collaboration and allows the liaison and remote engineer to mark-up and annotate the snapshot in real time, thus allowing both the liaison and remote engineer to view the annotations as they are made. For example, the remote engineer could sketch dimensions and highlight areas of concern on the snapshot while the snapshot is being viewed by the liaison. The annotations made to the snapshots may then be stored for future reference. In addition to Netmeeting, any other software application that allows the annotation of images in real time including, without limitation, PlaceWare, available from PlaceWare, Inc., 295 N. Bernardo Ave., Mountain View, Calif., and Microsoft Exchange, may be used in the present invention. Another software application that may be used for live collaboration is Infoworkspace, available from General Dynamics Electronic Systems, 100 Ferguson Drive, P.O. Box 7188, Mountain View, Calif., 94039-7188, which is a java-based software application that allows the use of a "thin-client" so that specialized collaboration software does not have to reside on computer 5000 and can be installed as needed.

In a preferred embodiment of the present invention, the remote engineer may use a touch sensitive smart board available from SMART Technologies, Inc., Suite 600, 1177-11th Ave. S.W., Calgary, Alberta, Canada, to annotate images.

In a preferred embodiment of the present invention, detailed inspection camera 2000 is a 990 Nikon Cool Pix, available from Nikon, Inc., 1300 Walt Whitman Road, Melville, N.Y., 11747-3064. The 990 Nikon Cool Pix preferably is used as camera 2000 because of its sophisticated auto-flash capability, battery life, 3.3 Megapixel resolution, and USB output. However, any digital camera that is capable of taking high resolution still and video imagery, has low light sensitivity, has a long battery life, is rugged and water resistant, and preferably capable of sharing the power source of computer 5000 may be used as camera 2000. Video cable 2100 preferably is a USB cable, but also may be any other suitable medium for transmitting video data.

In another embodiment of the present invention, a single camera (not shown) can be used in place of individual camera 1000 and 2000. This single camera (not shown) would be capable of transmitting both real time video and high resolution video images. In addition, this camera (not shown) would preferably have low light sensitivity, be able to share a power source with computer 5000, have a long battery life, and be rugged and waterproof.

In another embodiment of the present invention, a single camera used in place of camera 1000 and camera 2000 can be integrated into display unit 4000.

2. Audio Communications

As shown in FIG. 1, a wireless telephone 3000 that preferably is mounted in telephone housing 3200 preferably is used in the present invention to allow audio communication between the liaison and remote engineer. In addition to a wireless telephone, any other means for wireless audio communication, including, without limitation, a two-way radio and cellular telephone, may be used in place of wireless telephone 3000. A headset 3300 comprising an earphone 3320 and microphone 3310 preferably is plugged into wireless telephone 3000 using audio cable 3100 to permit hands-free audio communication between the liaison and remote engineer. In a preferred embodiment of the present invention, headset 3300 is an Andrea Electronics Corp. headset, model no. ANC100, available from Andrea Electronics Corp., 45 Melville Park Road, Melville, N.Y., 11747, used with a stereo-to-mono audio adapter.

In one embodiment of the present invention, wireless telephone 3000 preferably is incorporated into a cascading call-forwarding protocol system. In this embodiment, the liaison initially places a telephone call to an assigned remote engineer for assistance in the problem resolution. If this remote engineer is unable to answer the call, the call is automatically forwarded to a back-up remote engineer who will assist the liaison. If the back-up remote engineer is unable to answer the call, the call will continue to be forwarded up the chain-of-command until it is answered and a support team can be put in place. The use of this cascading call-forwarding system ensures that there will always be a remote engineer available to offer immediate assistance to the liaison. In a preferred embodiment of the present invention, wireless telephone 3000 preferably is provided by Spectralink, Inc., 5755 Central Avenue, Boulder, Colo., 80301-2848.

As shown in FIG. 1, wireless telephone housing 3200 preferably is used to support wireless telephone 3000 from harness 8000. As shown in FIG. 1, telephone housing 3200 preferably is configured to permit telephone 3000 to be extended from the body of the liaison and to be stored in an upright position (not shown) when not in use and after communications have been established. In a preferred embodiment of the present invention, the angle at which telephone 3000 extends from the liaison's body when in use may be adjusted through the use of a support cord 3235 and barrel stops 3230 and 3238. Using barrel stops 3230 and 3238, the length of support cord 3235 may be adjusted, thereby controlling the angle at which telephone 3000 extends from the body of the liaison.

Although not shown in FIG. 1, telephone 3000 may be stored upright against the body of the liaison by folding a support flap 3210 inwards toward the body of the liaison. Telephone 3000 is preferably stored in this upright position when telephone 3000 is not in use and when telephone 3000 is in use after communication has been established with the remote engineer. Hook and pile fastener tape preferably is mounted upon the outer surface of a telephone mounting strap 3215 and mounting strip 3220. In addition to hook and pile fastener tape, any suitable fastening means may be used to secure telephone mounting strap 3215 to mounting strip 3220 including, without limitation, zippers, buttons, snaps and clips.

In another embodiment of the present invention, audio communications between the liaison and remote engineer preferably are made using WLAN integrated Voice Over Internet Protocol ("VoIP") technology. The use of WLAN integrated VoIP technology would eliminate the need to use wireless telephone 3000 in the present invention. In this embodiment, headset 3300 preferably would be modified to be USB compatible and audio cable 3100 preferably would be a USB cable. In this embodiment, headset 3300 would be connected to computer 5000 using audio cable 3100.

The following is a detailed discussion regarding the use of VoIP technology according to the present invention. The present invention preferably would employ key enabling technology to achieve the current wireless connectivity, which is the IEEE 802.11b Standard for Wireless Local Area Networks. IEEE 802.11b is a national standard for wireless data transmission broadcasting over the 2.43 Ghz radio frequency. The IEEE standard has been adopted by companies such as CISCO, Harris, Symbol and others to allow mobile PCs to connect to standard IEEE 802.3 Ethernet LANs. The basic system architecture of 802.11b starts with a wireless hub, called an Access Point ("AP"), that plugs into a standard Ethernet port via an RJ-45 cable connection. The Access Point allows a mobile computer equipped with a PCMCIA client card, called a Mobile User ("MU"), to send and receive data to a conventional Ethernet network via a properly configured AP. The 802.11b standard allows wireless data throughput up to 11 Mbs, dividing the available bandwidth among all MUs associated with a particular AP. Association to a particular AP is established through a unique software setting called an SSID. Only MUs and APs with the same SSID can exchange information. There are various schemes that can be employed using SSIDs, channel designations, and the physical placement of APs to extend the range and signal density of a wireless network. All of these factors are taken into account when designing a wireless network. A Wireless Bridge can be used to relay data between wireless networks. Wireless Bridges ("WBs") also have a unique ability to be configured either for wireless relay or to operate as an autonomous Access Point. This operation can be accomplished remotely through a web based interface (each AP and WB has it's own IP address) or locally through an RS232 serial connection. This application can also be used to monitor the identity and number of users on the system to insure system security and quality of service. Most commercially available bridges are designed for indoor/outdoor use and can withstand cold temperatures. 802.11b is considered to be a leading wireless networking technology for use in harsh industrial and marine environments. The following components preferably are used with the present invention:

1) CISCO 340 Series PCMCIA Client Card, 100 Mw, available from Cisco Systems, 170 West Tasman Dr., San Jose, Calif., 95134, and
2) CISCO 340 Series Wireless Bridge, 100 Mw.

Access Points and Wireless Bridges preferably can be configured to encrypt data through either software or hardware based security schemes. In another embodiment of the present invention, headset 3300 may be incorporated into a hearing protection headset, hardhat, or other head and hearing protection system.

3. Display Unit

Figure 3:
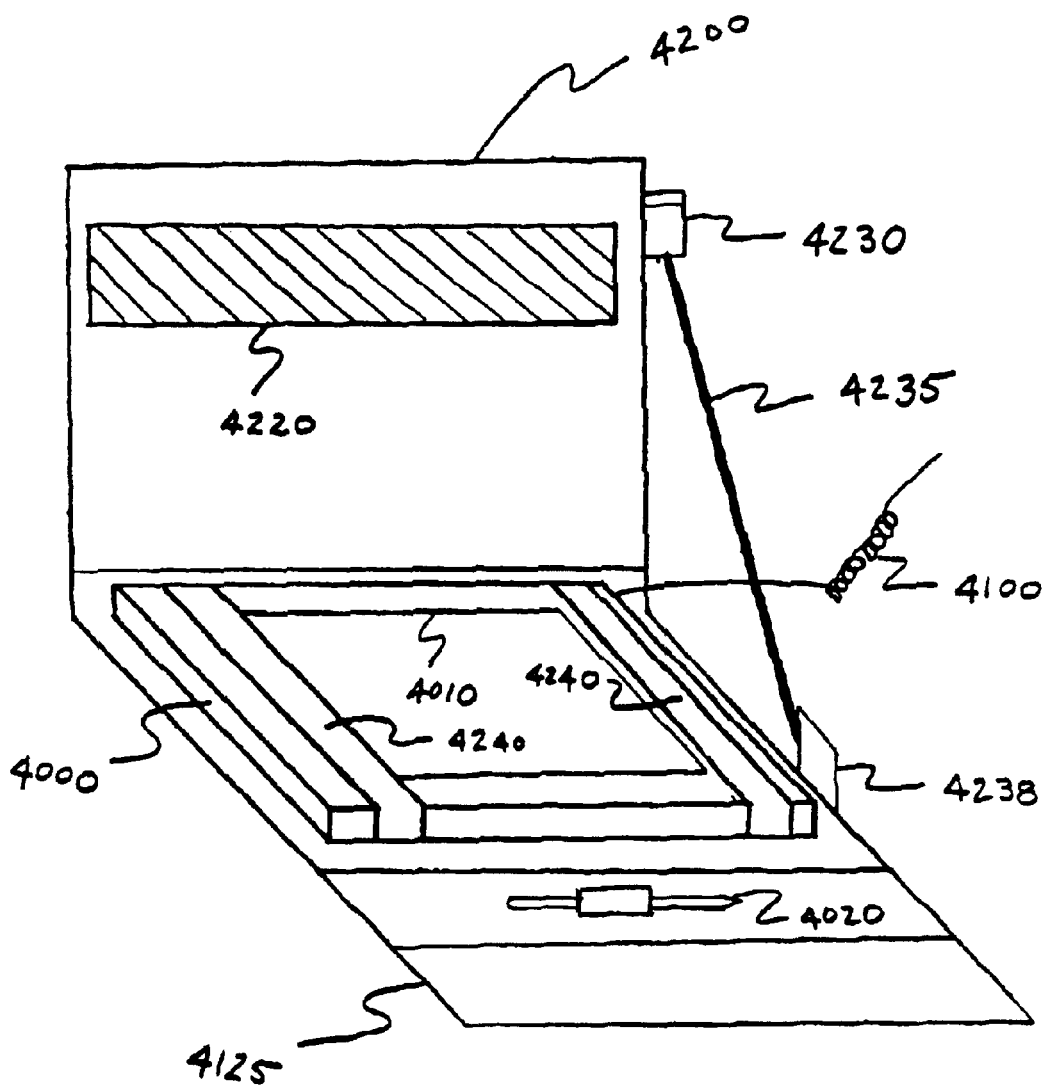
FIG. 3 is a schematic diagram of a display unit stored in a housing.

As shown in FIG. 3, display unit 4000 is used to provide data to the liaison wearing the present invention and to exchange data between the liaison and remote engineer. Display screen 4010 of display unit 4000 preferably utilizes a thin film transistor ("TFT") touch sensitive display surface, thus combining both video and "mouse" functions into display unit 4000. The liaison using the present invention preferably interfaces with display unit 4000 using a pen stylus 4020 on display screen 4010. As shown in FIG. 3, display unit 4000 preferably is stored in display housing 4200. Display unit 4000 is connected to computer 5000 using display cable 4100.

Display unit 4000 is used to provide data to the liaison and to exchange data between the liaison and the remote engineer. For example, after the liaison has taken snapshots of a problem using detailed inspection camera 2000 and downloaded the snapshots to computer 5000, display unit 4000 may be used to view the snapshots before they are transmitted to the remote engineer. When display screen 4010 uses a TFT touch sensitive display surface, the liaison may use the "whiteboarding" feature of Microsoft Netmeeting to make annotations using pen stylus 4020 on the snapshot that can be viewed by the remote engineer in real time. When exchanging data with the remote engineer, the liaison preferably may use a software application such as Netmeeting to view plan changes made by the remote engineer to address the problem to be resolved through the real time collaboration. The data from the real time collaboration also may be stored for future reference.

In a preferred embodiment of the present invention, display unit 4000 is a ViA II PC Pen Tablet with an Indoor Readable display, available from ViA, Inc., 12550 West Frontage Road, Ste. 201, Burnsville, Minn. 55337. The Indoor Readable display is preferred because of its backlight feature. A Sunlight Readable display, also available from ViA, Inc., may be used as display 4000 in situations where the present invention is being used outdoors where sunlight may interfere with the ability of the liaison to view display screen 4010. In another embodiment of the present invention, a transflective screen, available from ViA, Inc., or a Hewlett Packard No Power display, available from Hewlett Packard, 3000 Hanover Street, Palo Alto, Calif. 94304-1185, may be used as display unit 4000.

As shown in FIG. 1 and FIG. 3, display unit 4000 preferably is stored in display housing 4200 to support display unit 4000 from harness 8000. As shown in FIG. 1, display housing 4200 preferably is configured to permit display unit 4000 to be extended from the body 10 of the liaison when in use for hands-free operation and to permit display unit 4000 to be stored in a position flat against the body 10 of the liaison when not in use (not shown). In a preferred embodiment of the present invention as shown in FIG. 3, the angle at which display unit 4000 extends from the body 10 of the liaison, and the angle at which display unit 4000 may be viewed when in use, may be adjusted through the use of a support cord 4235 and barrel stops 4230 and 4238. Using barrel stops 4230 and 4238, the length of support cord 4235 may be adjusted, thereby controlling the angle at which display unit 4000 extends from the body of the liaison.

Also as shown in FIG. 3, display unit 4000 is fastened to display housing 4200 using fastening straps 4240. Fastening straps 4240 preferably are permanently secured to display housing 4200 at one end and removably fastened to display housing 4200 at the other end using hook and pile fastener tape or any other suitable fastening means including, without limitation, snaps, buttons, and clips. In another embodiment of the present invention, display unit 4000 may be removed from display housing 4200 for use in displaying information to others by either unfastening fastening straps 4240 or sliding the display in a lateral direction when fastening straps 4240 are loosened.

Although not shown in FIG. 1 or FIG. 3, when display unit 4000 is not in use, display unit may be stored in a flat position against the body 10 of the liaison by folding a storage flap 4125 inwards towards the body 10 of the liaison. A mounting strip preferably made of hook and pile fastener tape preferably is mounted upon the outer surface of a storage flap 4125 and mounting strip 4220. In addition to hook and piling fastener tape, any suitable fastening means may be used to secure storage flap 4125 to mounting strip 4220 including, without limitation, zippers, buttons, and snaps.

In another preferred embodiment of the present invention, a head mounted display 3330 may be used in lieu of display 4000. As shown in FIG. 1, head mounted display 3330 may be mounted on an arm 3335 extending from headset 3300. In addition, head mounted display 3330 may be incorporated into a pair of safety glasses. The use of head mounted display 3330 would enable the liaison to use "augmented reality" software applications. As an example, the liaison would be able to upload three-dimensional computer aided design ("CAD") models and overlay them over the scene that the liaison is viewing to assist in the resolution of engineering problems. In a preferred embodiment of the present invention, a Liteye 300, available from Liteye Microdisplay Systems, LLC, 12415 Dumont Way, Unit #103, Littleton, Colo. 80125, may be used as head mounted display 3330. The head mounted display used in this embodiment of the present invention may use technology including, but not limited to, curvilinear prism technology, liquid crystal display technology, or retinal scan display technology.

The present invention likewise may incorporate a wrist mounted keyboard (not shown), a wrist mounted finger mouse (not shown), or any other ergonomically adapted keyboard or mouse (not shown).

4. Computer

As shown in FIG. 2, computer 5000 is used in the present invention to provide information to the liaison wearing the present invention and to facilitate the exchange of information between the liaison and the remote engineer or to permit the liaison to continue working independent of the remote computer network as required. Computer 5000 preferably is a wearable computer. As shown in FIG. 2, computer 5000 preferably is stored in computer housing 5200 to support computer 5000 from harness 8000.

While numerous wearable computers capable of wireless communications may be used as computer 5000, computer 5000 preferably is a ViA IIB or ViA IIC (Transmeta processor) wearable personal computer, available from ViA, Inc., 12550 West Frontage Road, Ste. 201, Burnsville, Minn. 55337, or a ViA IIR wearable personal computer, available from General Dynamics Information Systems, 8800 Queen Avenue South, Bloomington, Minn., 55431. The ViA IIR is a ruggedized modified version of the ViA IIB.

The ViA IIB is preferable as computer 5000 because it uses a Cyrix processor, which generally consumes less power and generally has a cooler operating temperature than processors available from Intel and AMD. The ViA IIB preferably is used for computer 5000 because it possesses the following capabilities. The ViA IIB is Microsoft Windows 9X compatible and currently uses Windows 98 as its operating system. The ViA IIB has two internal PCMCIA slots to accommodate a 100 mW wireless LAN card. Using, for example, an Aironet wireless communication system, available from Cisco Systems, Inc., 170 West Tasman Drive, San Jose, Calif., 95134, computer 5000 is able to transmit and receive data over a WLAN connection using the IEEE 802.11(x) protocol.

In another preferred embodiment of the present invention, computer 5000 may be the ViA IIC, which incorporates a Transmeta Crusoe processor. Like the ViA IIB, the ViA IIC has two PCMIA slots to accommodate WLAN communication. The ViA IIC is preferable because it uses a faster processor, produces less heat, and is capable of using a variety of operating systems including Windows 95, Windows 98, Windows 2000, Windows NT 4.0, and Sun, Hewlett-Packard, Apple Macintosh, and IBM operating systems.

A ViA IIR preferably may be used as computer 5000 because it is "ruggedized" to withstand a greater shock than a conventional wearable personal computer can be expected to withstand. The ViA IIR takes the basic core unit of a commercial ViA IIB and consolidates it into a 3.8"×5.9"×1.6" box machined from a solid block of aluminum that is sealed to be water tight and able to withstand shock. A hollow cell is machined into the box containing the motherboard, processor, chipset, RAM and all other associated electronic components. This cell is waterproof and the motherboard is designed to use the thermal mass of its container as a heat sink.

To further enhance high heat performance, a cooling tunnel, located adjacent to the processor cell, is incorporated into the design of the ViA IIR. The tunnel contains a large aluminum heat sink and a compact cooling fan generating a steady air stream over its fins. In order to facilitate air exchange, the cooling tunnel is not sealed. The cooling fan is rugged enough to withstand repeated exposures to water and can be easily replaced if it is damaged. Preferably, a cooling fan providing greater airflow than the fan used in a standard ViA IIB is used to provide increased cooling capacity, thus allowing the ViA IIR to operate in a high temperature environment. A Cyrix or Transmeta processor preferably is used in the ViA IIR because of their low power draw resulting in longer battery life and cooler running temperatures. This makes the ViA IIR preferable over other conventional wearable personal computers that use Intel and AMD processors that generally consume more power than the Cyrix processor.

The ViA IIR preferably may be used for computer 5000 because it is possesses the following capabilities. The ViA IIR is Microsoft Windows 9X compatible, and currently uses Windows 98 as its operating system. In addition, the ViA IIR is also capable of using Windows NT 4.0 as its operating system. The ViA IIR has an internal PCMCIA slot to accommodate a 100 mW wireless LAN card. Using, for example, an Aironet wireless communication system, available from Cisco Systems, Inc., 170 West Tasman Drive, San Jose, Calif., 95134, computer 300 is able to transmit and receive data over a WLAN connection using the IEEE 802.11 protocol.

The present invention preferably uses wireless communication to permit collaborative problem or data gathering resolution between the liaison wearing the present invention and the remote engineer. The following is an example of how the liaison and remote engineer may collaborate to resolve a problem. After identifying a problem on the job site or arriving at the location of interest and contacting the remote engineer using wireless telephone 3000 or other wireless audio communication means such WLAN integrated VoIP communication using computer 5000, the liaison may first transmit real time video using general inspection camera 1000. The real time video is transmitted using wireless communication from computer 5000 to the computer system being used by the remote engineer. Computer 5000 may use software such as Netsnap, available from PeleSoft, 2115 Palm Bay Rd., N.E., Palm Bay, Fla. 32905, for the streaming of video using wireless communication.

The liaison may then collect high-resolution imagery snapshots of the problem using detailed inspection camera 2000 and download the snapshots to computer 5000. The liaison may then review the downloaded snapshots on display unit 4000 and make annotations to the snapshots using the "whiteboarding" feature of Microsoft Netmeeting. The annotations may be viewed by the remote engineer in real time using whiteboarding. The remote engineer likewise may make additional annotations to the snapshots using "whiteboarding" that can be viewed by the liaison in real time. These annotations may then be stored by either the liaison, remote engineer, or both for future reference.

Computer 5000 preferably may also be used to exchange technical information such as project plans and technical specifications between the liaison and design engineer. In one embodiment of the present invention, the liaison could open a CAD application such as Autocad, available from Autodesk, Inc., 111 McInnis Parkway, San Raphael, Calif., and select to share this application while using Netmeeting, causing the AutoCAD application to "pop-up" on the remote engineer's conferencing window. The remote engineer may then take control of the Autocad application that is being hosted on computer 5000 and make changes to the design plans that could be viewed by the liaison and any other persons participating in the "Netmeeting." The Netmeeting application also permits instant text messaging, which would enable the liaison to contact and collaborate with the remote engineer online rather than using wireless telephone 3000 or other means of audio communication. Netmeeting also permits files to be transferred between computer 5000 and the remote engineer's computer. In addition to AutoCAD, any other suitable software package featuring "application sharing" may be used according to the present invention. One such software package is Visualizer, available from Parametrics Technology Corp., 128 Technology Drive, Waltham, Mass., 02453.

In addition to collaboration through "whiteboarding," the liaison and remote engineer may also collaborate using a more sophisticated version of "whiteboarding" known as "redlining." "Redlining" generally allows users to mark up vector based images (and certain bitmap formats such as CALS C4) using software applications such as Autodesk's Volo View, TMS View Director, available from TMSS Headquarters, 206 W. 6$^{th}$ Ave., Stillwater, Okla., 74074, Intergraph's ImageR, available from Integraph, Inc., 8252 Hwy. 20 West, Madison, Ala., and CPC View, available from Cartesian Products, Inc., 30 Wesley Street, Ste. 2, Newton, Mass. 02458. Product View, available from Parametric Technology Corp., may also be used for redlining applications or any other type of application sharing. "Redlining" is usually focused on the mark up of technical drawings because it can facilitate CAD and Computer Aided Engineering ("CAE") options such as layer assignment, revision history, dimensioning, and dynamic panning and zooming. Layers preferably can be designated so that another designer cannot override the changes made by the liaison or remote engineer. In addition to collaborating with the remote engineer using the above applications, the liaison preferably may likewise independently access these applications before collaborating with the remote engineer. Independently accessing these applications before contacting the remote engineer may allow the liaison to view the latest drawings and revision change notices to discover what may be a "prior fix" to the problem currently being encountered by the liaison.

In another embodiment of the present invention, digital signature verification software, such as Sign-It for Microsoft Word and Adobe Acrobat 4.0, available from Communication Intelligence Corp., 275 Shoreline Drive, Suite 500, Redwood Shores, Calif., 94065-1413, may be used with the present invention.

In situations where wireless communication is unavailable or becomes temporarily disabled, the liaison may collect data for later use, which is commonly referred to as "store and forward." When wireless communication becomes available, the liaison preferably may retrieve the stored data and collaborate with the remote engineer.

In addition to the above listed applications, computer 5000 may use any other software applications that facilitate collaboration between the liaison and remote engineer to resolve an on-site problem. Software applications that may be used with the present invention preferably include some or all of the following features: whiteboard, redlining, video and VoIP technology, information sharing, and peer to peer file transfer. Software such as Microsoft Exchange may be used as the collaborative software according to the present invention. Computer 5000 may also be used to store voice and video data for future reference.

At locations where the use of a WLAN is not feasible or available, long range wireless LAN communication, as available from BreezeCom, 5858 Edison Place, Carlsbad, Calif., 92008, for example, may be used to establish wireless communication. If long range wireless LAN communication is not available, satellite based communication, as available from DirecPC, 11717 Exploration Lane, Germantown, Md., 20876, for example, may be used to establish wireless communication. In addition to these examples, any other type of wireless communication may be used with the present invention.

As shown in FIG. 2, battery 6000 supplies power to computer 5000 using power cable 6100. Battery 6000 is stored in battery housing 6200, which preferably supports battery 6000 from harness 8000. In a preferred embodiment of the present invention, battery 6000 is two Molicel ME202BB batteries, available from E-One Moli Energy Limited, North American Sales Office and Production Facility, Maple Ridge, BC, Canada, V2X 9E7. The Molicel ME202BB is preferred because of its high energy density characteristics and thermal resistance. The Molicel ME202BB is the battery that is shipped with the ViA IIB computer. The Energy Access SBS series smart battery charger that is also shipped with the ViA IIB computer is likewise preferred because it uses "smart charging technology" that allows the battery to be charged at various levels of discharge with diminished risk of developing battery "memory" or overcharging the battery. This battery supports Microsoft Windows Power Management, which will display the percentage of power remaining in the battery, can be set to send a warning message when the battery charge is reduced to a certain level, and allows the "hot-swapping" of batteries. In addition, this battery includes a touch sensitive film switch on the battery itself with a relative power indicator.

As shown in FIG. 1, the present invention preferably may also include an interface hub 7000 that may be used to add additional peripheral devices to the present invention and/or to simplify the connection of components to computer 5000. In a preferred embodiment of the present invention, interface hub 7000 may be a Targus Multiport 4 Port USB Hub, Model No. PA06OU, available from Targus, Inc., 121 N. Miller St., Anaheim, Calif. 92806. The use of a Targus 4 Port USB Hub provides the ability to add additional USB devices to the present invention.

In another preferred embodiment of the present incentive, hub 7200, which secures interface hub 7000 to harness 8000, may also be used to store general inspection camera 1000 when general inspection camera 1000 is not in use.

5. Harness

As shown in FIG. 1, FIG. 2, and FIG. 4 harness 8000 preferably is used to support general inspection camera 1000, detailed inspection camera 2000, wireless telephone 3000, display unit 4000, computer 5000, battery 6000, and interface hub 7000 from the body 10 of the liaison wearing the present invention. Referring to FIG. 4, a preferred embodiment of harness 8000 is a modified "back support belt" commonly worn by warehouse workers to ease the strain of lifting and long hours standing on concrete floors. An inner belt 8100 is atypical adjustable back support belt preferably with an outer hook and pile fastener tape surface. In addition to hook and piling fastener tape, any other method of fastening may be used such as buttons, snaps, and zippers. Inner belt 8100 preferably is adjustable to many body types because it is fastened using a hook and piling fastener tape patch (not shown) located on the inside surface of an outer flap 8110. An adjustable outer belt 8200 preferably constructed from nylon is positioned over inner back support belt 8100 and is held in place using support loops 8210 that are secured to the outer surface of inner belt 8100. Outer belt 8200 preferably is adjustable and may have its ends fastened to one another using clasp 8230 as shown in FIG. 4. The ends of belt 8200 may also be secured to one another using any other suitable fastening means including, without limitation, buckles, snaps, button, hook and pile fastener tape, and clips. Harness 8000 as shown has the added benefit of providing additional lumbar support to the liaison wearing the present invention.

Detailed inspection camera 2000, wireless telephone 3000, display unit 4000, computer 5000, battery 6000, and interface hub 7000 may be supported from outer belt 8200 by running outer belt 8200 through support loops (not shown) located on the inside surfaces of detailed inspection camera storage case 2200, wireless telephone housing 3200, display housing 4200, computer housing 5200, battery housing 6200, and hub housing 7200. In a preferred embodiment of the present invention, hook and pile fastener tape patches sewn onto the support loops located on the inside surfaces of detailed inspection camera case 2200, wireless telephone housing 3200, display housing 4200, computer housing 5200, battery housing 6200, and hub housing 7200 prevent the various components from sliding about inner belt 8100 because the hook and pile fastener tape patches on the support loops adhere to the outer hook and pile fastener tape surface of inner back support belt 8100. This preferred embodiment has the added benefit of allowing other components such as additional storage pockets to easily be supported from outer belt 8200. In addition, this embodiment allows for the reconfiguration, addition, or deletion of various components depending upon the liaison's needs. In addition to this preferred embodiment, any fastening means including snaps, buttons, zippers and clips may be used to support the components from harness 8000.

As shown in FIG. 4, harness 8000 also comprises adjustable shoulder straps 8300 and 8400 that provide additional support for the liaison wearing the present invention. Shoulder straps 8300 and 8400 preferably are adjusted so that inner back support belt 8100 is properly positioned on the liaison.

As shown in FIG. 4, cable conduits 8610 and 8620 preferably are incorporated into harness 8000 to prevent the cables used in the present invention from causing inconvenience or snagging. As shown in FIG. 4, cable conduit 8610 preferably runs along the upper edge of inner belt 8100 and cable conduits 8610 and 8620 run along the outside of shoulder straps 8300 and 8400. In addition to this embodiment, cable conduits may be positioned at any other suitable location in harness 8000.

Cable conduits 8610 and 8620 preferably are constructed from two-sided hook and pile fastening tape. One edge of the tape is secured to harness 8000 using stitching or any other suitable fastening means including, without limitation, snaps, buttons, zippers, or clips. The other edge of the tape remains free. The cable to be passed through the conduit preferably is rolled into the tape, enclosing the cable in the conduit. An advantage of using the hook and piling fastening tape in this embodiment is the ability to create an aperture at any point along the conduit to permit the cable to exit the conduit. Corresponding apertures may be made at other location throughout the cable conduits to permit the cables to be appropriately positioned.

In addition to the above example, any other suitable material may be used to construct cable conduits 8610 and 8620, and cable conduit may be positioned at any appropriate location on harness 8000.

Harness 8000 as shown in FIG. 1, FIG. 2 and FIG. 4 is a preferred embodiment of the present invention. However, there are numerous other means that may be used to support general inspection camera 1000, detailed inspection camera 2000, wireless telephone 3000, display unit 4000, computer 5000, battery 6000, and hub housing 7200 from the body of the liaison. For example, a harness could be used that incorporates pockets to hold the various components. In addition, a harness could be used that has high-resolution storage case 2200, wireless telephone housing 3200, display housing 4200, computer housing 5200, battery housing 6200, and hub housing 7200 fastened to the outside surface of the harness at suitable locations on the body 10 of the liaison wearing the harness as shown in FIG. 1, and FIG. 2.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. An apparatus for enabling a collaborative work environment between a first person at a first location and a second person at a second location, comprising:
    a first camera adapted to obtain first imagery relevant to an object;
    a second camera adapted to obtain second imagery relevant to an object;
    a microphone;
    a speaker;
    a first display unit;
    a computer adapted to store and to process data and adapted to be worn on a user's body;
    a first communications channel connecting said computer and said first camper;
    a second communications channel connecting said computer, said microphone and said speaker;
    a third communications channel connecting said computer and said first display unit;
    a fourth communications channel connecting said computer and a remote data processing, said remote data processor adapted to receive data from and transmit data to said computer; and
    a fifth communications channel connecting said computer and said second camera.

2. The apparatus of claim 1 further comprising a battery adapted to provide power to said computer.

3. The apparatus of claim 1 further comprising a battery adapted to provide power to said first display unit.

4. The apparatus of claim 1 further comprising a harness adapted to selectively carry at least one of said first camera, said second camera, said computer, said first display unit, and said battery.

5. The apparatus of claim 1 wherein said first imagery is video.

6. The apparatus of claim 1 wherein said first imagery is real time video.

7. The apparatus of claim 1 wherein said second imagery is a snapshot.

8. The apparatus of claim 1 wherein said second imagery is video.

9. The apparatus of claim 1 wherein said second imagery is real time video.

10. The apparatus of claim 1 wherein said second imagery is a snapshot.

11. The apparatus of claim 1 wherein said second camera has a narrower field of view than said first camera.

12. The apparatus of claim 1 wherein said microphone and said speaker comprise a headset.

13. The apparatus of claim 1 wherein said first display unit is adapted to receive data input from said user and to transmit said data to said computer.

14. The apparatus of claim 1 wherein said computer includes a graphical user interface.

15. The apparatus of claim 1 wherein said fourth communications channel is wireless.

16. The apparatus of claim 1 wherein said fourth communications channel is adapted for radio communication.

17. The apparatus of claim 1 wherein said fourth communications channel is adapted for video communication.

18. The apparatus of claim 17 wherein said video communication comprises real-time video.

19. The apparatus of claim 17 wherein said video communication comprises a snapshot.

20. The apparatus of claim 1 wherein said fourth communications channel is adapted for data communication.

21. The apparatus of claim 1 wherein said fourth communications channel allows collaboration between said first person and said second person.

22. The apparatus of claim 1 wherein said fourth communications channel allows real time collaboration between said first person and said second person.

23. The apparatus of claim 1 wherein said computer is mounted in a shock resistant housing.

24. The apparatus of claim 1, wherein said computer is mounted in a housing machined from a block of metal.

25. The apparatus of claim 24 wherein said housing includes a cooling tunnel and a cooling fan.

26. The apparatus of claim 1 wherein said harness includes at least one of a back support belt, an accessory pouch, and a cable conduit.

27. The apparatus of claim 1 further comprising a second display unit and a corresponding communications channel connecting said computer and said second display unit.

28. The apparatus of claim 27 wherein said second display unit is incorporated into a headset.

29. The apparatus of claim 27 wherein said second display unit is incorporated into protective eyewear.

30. An apparatus for enabling a collaborative work environment between a first person at a first location and a second person at a second location, comprising:

a first camera having a first field of view adapted to obtain first imagery relevant to an object;

a second camera having a second field of view for obtaining second imagery relevant to said object wherein said first field of view is wider than said second field of view;

a headset comprising a microphone and a speaker;

a display unit;

a computer adapted to store and to process data and adapted to be worn on a user's body, said computer having a graphical user interface;

a first communications channel connecting said computer and said first camera;

a second communications channel connecting said computer and said headset;

a third communications channel connecting said computer and said display unit;

a fourth communications channel connecting said computer and said second location, said fourth communications channel being adapted for at last one of audio and video communication, said fourth communications channel being further adapted for collaboration between said first person and said second person;

a fifth communications channel connecting said computer and said second camera; and a harness adapted to carry at least one of said first camera, said second camera, said computer, and said display unit.

31. The apparatus of claim 30 further comprising a battery adapted to provide power to said computer.

32. The apparatus of claim 30 further comprising a battery adapted to provide power to said display unit.

33. The apparatus of claim 30 wherein said fourth communications channel is adapted for real time collaboration between said first person and said second person.

34. The apparatus of claim 30 wherein said fourth communications channel is adapted for real time collaboration between said first person and said second person.

* * * * *